United States Patent [19]

Wright

[11] Patent Number: 4,544,700

[45] Date of Patent: Oct. 1, 1985

[54] POLY(ARYLENE SULFIDE) COMPOSITION CONTAINING AN ETHYLENE POLYMER

[75] Inventor: Roy F. Wright, Bartlesville, Okla.

[73] Assignee: Phillips Petroleum Company, Bartlesville, Okla.

[21] Appl. No.: 600,754

[22] Filed: Apr. 16, 1984

[51] Int. Cl.[4] .............................................. C08L 27/21
[52] U.S. Cl. .................... 524/543; 524/496; 524/609; 524/847; 524/424; 525/189; 264/331.11; 264/331.17
[58] Field of Search ............... 524/496, 543, 609, 847, 524/424; 525/189; 264/331.11, 331.17

[56] References Cited

U.S. PATENT DOCUMENTS

| | | | |
|---|---|---|---|
| 2,825,721 | 3/1958 | Hogan et al. | 260/88.1 |
| 3,354,129 | 11/1967 | Edmonds, Jr. et al. | 260/79 |
| 3,396,110 | 8/1968 | Hill, Jr. et al. | 252/42.1 |
| 3,487,454 | 12/1969 | Oates et al. | 260/900 |
| 3,737,411 | 6/1973 | Scoggins | 260/63 R |
| 3,867,189 | 2/1975 | Edmonds, Jr. | 521/64 |
| 3,903,017 | 9/1975 | Ziegler et al. | 260/94.9 |
| 3,925,530 | 12/1975 | Rees | 264/297 |
| 3,929,708 | 12/1975 | Brady et al. | 260/29.1 |
| 4,025,582 | 5/1977 | Needham | 260/45.7 |
| 4,134,874 | 1/1979 | Needham | 260/37 SB |
| 4,247,598 | 1/1981 | Blackwell | 260/28 R |
| 4,365,037 | 12/1982 | Adachi et al. | 524/449 |

*Primary Examiner*—Melvyn I. Marquis
*Attorney, Agent, or Firm*—French & Doescher

[57] ABSTRACT

A poly(arylene sulfide) composition containing a minor amount of low-density polyethylene. In applications such as poly(arylene sulfide) reinforced molding compositions, the invention composition will generally contain a poly(phenylene sulfide), a reinforcing material such as glass or carbon fibers, and from about 0.1 to about 10 weight percent, based on the weight of the composition, of an ethylene polymer having a density of from about 0.910 to about 0.940 g/cc and a melt index of greater than 100 g/10 min.

24 Claims, No Drawings

POLY(ARYLENE SULFIDE) COMPOSITION CONTAINING AN ETHYLENE POLYMER

BACKGROUND

Reinforced poly(arylene sulfide) compositions are highly suitable for molding into a variety of objects which require strength, high temperature stability and chemical resistance. When carbon or glass-reinforced poly(phenylene sulfide) is molded into a large thick-walled object, such as a gas tank, internal cracking of the walls is sometimes encountered. The problem can be countered somewhat by using low melt flow, linear poly(phenylene sulfide) and is generally less pronounced with glass reinforcement than carbon reinforcement. High-density polyethylene has been used in reinforced poly(phenylene sulfide) molding compositions to improve the processability and mold release properties of the compositions. The problem of internal cracking in thick-walled parts, however, has not been consistently resolved by the addition of high-density polyethylene to the molding composition, particularly in compositions containing branched, high melt flow resin and carbon fiber reinforcement. A factor in the choice of crack-inhibiting additives is the effect of any such additive on other properties of the molding composition and of the molded article produced from the composition. The additive must not have a substantial adverse effect on the mechanical properties of the molded article and must not, as a rule, significantly decrease the flow rate of the molding composition.

It is therefore an object of the invention to provide poly(arylene sulfide) molding compositions. It is a further object of the invention to provide fiber-reinforced poly(arylene sulfide) molding compositions which can be molded into articles having improved crack resistance.

SUMMARY OF THE INVENTION

According to the invention, a composition is provided comprising a poly(arylene sulfide), a low-density ethylene polymer, and a reinforcing material such as glass fibers or carbon fibers. Such a composition will generally contain from about 35 to about 85 weight percent of the poly(arylene sulfide) component, from about 10 to about 60 weight percent of the reinforcing material, and from about 0.1 to about 10 weight percent of an ethylene polymer having a density of from about 0.910 to about 0.940 g/cc. The invention compositions are useful as molding compositions for thick-walled articles.

DETAILED DESCRIPTION OF THE INVENTION

The invention composition contains a poly(arylene sulfide). There are various grades and types of arylene sulfide polymers which are suitable for use in the invention, the choice of which is not critical and will depend upon the desired end use of the composition. A reinforced poly(arylene sulfide) molding composition will generally contain about 35 to about 85, preferably about 50 to about 75, most preferably about 50 to 65 weight percent poly(arylene sulfide), based on the weight of the composition.

Suitable resins are described, for example, in U.S. Pat. Nos. 3,354,129 and 3,919,177. For use in reinforced molding compositions, the preferred poly(arylene sulfide) is poly(phenylene sulfide) having a melt flow of less than about 400 g/10 min, as measured by ASTM D-1238, Procedure B using a 5 kg weight at 600° F. through a 0.0825 inch diameter orifice. Such poly(phenylene sulfide) can be prepared according to the process of U.S. Pat. No. 3,354,129 and air-cured to the desired melt flow or, alternatively, it can be prepared by the process of U.S. Pat. No. 3,919,177 with optional minor amount of trichlorobenzene branching agent to achieve the desired melt flow poly(phenylene sulfide). Highly suitable poly(arylene sulfide)s are commercially available as Ryton ® poly(phenylene sulfide) resins of melt flow from about 30 to about 400 g/10 min or greater as desired.

The use of a copolymer comprising arylene sulfide repeating units is within the scope of the invention, with poly(arylene sulfide)s containing at least 90 percent of unsubstituted phenylene units being preferred for their properties and commercial availability.

The invention compositions contain a minor amount of a low-density, solid ethylene polymer. Ethylene homopolymers and copolymers may be used, with ethylene polymers prepared from the incorporation of monomers comprising about 90 to about 100 mole percent ethylene and 10–0 mole percent of another monomer, preferably a 1-olefin. By "low density" is meant an ethylene polymer having a density of from about 0.910 to about 0.940, preferably about 0.910 to about 0.930, as determined by test method ASTM D1505.

The ethylene polymer will generally be present in the invention composition in an amount of from about 0.1 to about 10 weight percent, based on the total weight of the composition. In a preferred composition, the ethylene polymer will make up from about 0.2 to about 5, most preferably about 0.25 to about 3 weight percent of the composition.

The low-density ethylene polymer useful for the invention compositions is preferably a polymer having a melt index greater than about 100, most preferably greater than about 400 g/10 min. The weight average molecular weight ($M_w$) of the polymer is not critical but will generally range from about 1,000 to about 20,000, with preferred ethylene polymers having weight average molecular weights of from about 1,000 to about 5,000.

The invention compositions exhibit mold crack resistance of high consistency, and have mechanical properties equivalent to molding compositions containing high density ethylene polymers used for improving processability and superior to compositions containing no polyethylene additive.

The invention composition includes a reinforcing material such as glass or carbon fibers. When present, such materials will generally make up from about 10 to about 60 weight percent, preferably about 20 to about 50, and most preferably about 25 to about 45 weight percent, based on the total weight of the composition.

The composition can optionally include filler materials such as calcium carbonate and calcium sulfate, for example. Suitable amounts of filler will vary widely but will generally be from about 0 to about 50, preferably from about 0 to about 20 weight percent, and, when present, preferably about 5 to about 20 weight percent, based on the total weight of the composition.

The composition can contain additional optional components such as mold corrosion inhibitors, pigments, processing aids and the like. The preferred composition will contain about 0.5 to about 2.0 weight percent of a mold corrosion inhibitor such as $Li_2CO_3$ or a hydrotalcite.

The ethylene polymer can be added to the poly(arylene sulfide) composition in any manner desired, but it is preferable to dry mix all the components and then to melt mix the resulting blend by extrusion at an elevated temperature, suitably from about 500° F. to about 650° F. The resulting composition is then chopped or granulated for later extrusion and/or molding into a molded product.

EXAMPLE I

This example describes the procedure used to prepare and evaluate poly(phenylene sulfide) (PPS) compositions containing polyethylene. The example also illustrates the effects that the density and melt index of the polyethylene have on the crack resistance of injection molded poly(phenylene sulfide) compositions. The procedure is as follows: A mixture of 1650 grams PPS (from Phillips Petroleum Co., melt flow 230–250 grams/10 minutes measured by test method ASTM D1238, Procedure B modified to use a 5 kilogram weight at 600° F. with a 0.0825 inch diameter orifice), 1200 grams of 0.125 inch length glass fibers (Owens Corning 197 fiberglass), 60 grams of pigment (Davis Brown No. 6623), 30 grams of $Li_2CO_3$ and 60 grams of low density polyethylene (AC-6 from Allied Chemical Co., density 0.920, melt index >400 grams/10 minutes, softening point 222° F., viscosity 350 cps at 140° C.) were dry blended in a tumbler and the mixture extruded through a Davis Standard Extruder No. 2 at 600° F. with no die, a DD mixing screw, 120 rpm, and air cooled. The extrudant was ground into pellets or coarse powder and injection molded at 600° F. in a New Britain injection molding machine using a mold cavity temperature of 100° F. Disks 2.5 inches in diameter by 0.5 inch thick were prepared.

After a total of 18 disks had been molded and cooled to ambient room temperature, 8 of the disks were cut parallel to the face to 0.25 inch thickness and visually examined for cracks. These cut disks were then annealed for 2 hours at 400° F. A second set of 8 whole disks was annealed for 2 hours at 400° F. After cooling, these disks were cut circumferentially as before. All samples were then rated for cracking 48 hours after annealing.

The procedure was repeated in runs using lower levels and/or different polyethylenes. The results shown in Table I indicate that the most crack-resistant composition contained 2 weight percent of a low density, high melt index polyethylene. At a lower concentration, (composition No. 5) crack resistance was good on the non-sprue side. The polyethylene was less effective at the level of 0.25 weight percent (composition No. 6) than at higher concentrations. Compositions containing 1 to 2 weight percent of a polyethylene having higher density have significantly less effect on crack resistance after molding.

The described tests were run using poly(phenylene sulfide) resin having a relatively high flow rate, which tends to increase cracking susceptibility in the molded article. Articles prepared using linear poly(phenylene sulfide) of flow rate about 30–60, for example, and chopped glass fiber reinforcement would tend to exhibit lower cracking susceptibility, compared with articles prepared using molding resin of higher melt flow, branched resin or chopped carbon reinforcement. Use of the low density polyethylene therefore provides more options in selection of the resin and the reinforcing material for poly(arylene sulfide) molding compositions.

TABLE I

Effect of Polyethylene on Cracking Resistance of Molded Glass Fiber Reinforced Poly(phenylene Sulfide) Compositions

| | | | 1 | 2 | 3 | 4 | 5 | 6 |
|---|---|---|---|---|---|---|---|---|
| A. Composition, Wt. % | | | | | | | | |
| PPS | | | 55.0 | 55.0 | 56.75 | 56.0 | 56.0 | 56.75 |
| Fiberglass[f] | | | 40.0 | 40.0 | 40.0 | 40.0 | 40.0 | 40.0 |
| Pigment | | | 2.0 | 2.0 | 2.0 | 2.0 | 2.0 | 2.0 |
| $Li_2CO_3$ | | | 1.0 | 1.0 | 1.0 | 1.0 | 1.0 | 1.0 |
| Polyethylene | Density | M.I.[e] | | | | | | |
| HDPE[a] | 0.965 | 30 | 2.0 | — | 0.25 | — | — | — |
| LDPE[b] | 0.923 | 2 | — | — | — | 1.0 | — | — |
| LDPE[c] | 0.920 | >400 | — | 2.0 | — | — | 1.0 | 0.25 |
| B. Cracking[d] | | | | | | | | |
| 1. Sprue Side | | | | | | | | |
| a. Unannealed | | | 7 | 0 | 7 | 5 | 2 | 5 |
| b. Annealed/Cut | | | 8 | 5 | 7 | 8 | 8 | 7 |
| c. Cut/Annealed | | | 8 | 8 | 8 | 8 | 8 | 8 |
| 2. Non-Sprue Side | | | | | | | | |
| a. Unannealed | | | 0 | 0 | 0 | 0 | 0 | 0 |
| b. Annealed/Cut | | | 3 | 0 | 8 | 1 | 0 | 1 |
| c. Cut/Annealed | | | 8 | 0 | 8 | 7 | 0 | 8 |

[a]Density 0.965, melt index 30, available from Phillips Petroleum Co.
[b]Density 0.923, melt index 2.0, tensile strength 1700 psi, % elongation 400, available from Dart Industries (Rexene Polyolefins Co.)
[c]Density 0.920, melt index >400, softening point 222° F., viscosity 350 cps at 140° C., available from Allied Chemical Co.
[d]Number of disks cracked out of 8 tested.
[e]ASTM D 1238, 190° C., 2.16 Kg load, except sample c, which was run at 140° C.
[f]Owens Corning OC 197, ⅛ inch long × 0.00062 inch diameter.

EXAMPLE II

This example illustrates the effect of a low density, high melt index polyethylene on the crack resistance of molded PPS having a carbon fiber reinforcing agent. The mixing, molding and testing procedure described in Example I was repeated with noted changes. PPS having a melt flow of about 50 was used, and the composition contained no pigment. The results shown in Table II indicate that the low density, low melt index polyethylene was effective in inhibiting cracking in the molded PPS. The tests were performed using resin having a very low flow rate, which tends to reduce cracking in the molded article, and a carbon fiber, which tends to increase cracking susceptibility.

TABLE II

Effect of Polyethylene on Cracking Resistance of Molded Carbon Fiber Reinforced Poly(phenylene Sulfide) Compositions

|   |   | 1 | 2 | 3 | 4 |
|---|---|---|---|---|---|
| A. | Composition, Wt. % | | | | |
|   | PPS[a] | 69 | 68 | 69 | 68 |
|   | Carbon Fiber A[b] | 30 | 30 | — | — |
|   | Carbon Fiber B[c] | — | — | 30 | 30 |
|   | Li$_2$CO$_3$ | 1 | 1 | 1 | 1 |
|   | LDPE[d] | — | 1 | — | 1 |
| B. | Cracked[e] | | | | |
|   | a. Annealed/cut | 8 | 3 | 4 | 0 |
|   | b. Cut/Annealed | 8 | 1 | 1 | 0 |

[a]Uncured PPS of melt flow 50 from Phillips Petroleum Company.
[b]Panex ® ¼ CF-30 carbon fiber
[c]Fortafil ® 5 carbon fiber
[d]Density 0.920, MI >400 (see footnote C, TABLE I).
[e]Number of disks cracked out of 8 tested.

I claim:
1. A composition comprising
   (a) a poly(arylene sulfide),
   (b) an ethylene polymer having a density in the range of about 0.910 to about 0.940 g/cc and a melt index of greater than about 100 g/10 min present in an amount within the range of about 0.1 to about 10 weight percent, based on the weight of the composition, and
   (c) a fibrous reinforcing material.
2. The composition of claim 1 in which the ethylene polymer is an ethylene homopolymer.
3. The composition of claim 1 in which the fibrous reinforcing material is selected from glass fibers and carbon fibers.
4. The composition of claim 1 in which the poly(arylene sulfide) is present in an amount of from about 50 to about 75 weight percent, the fibrous reinforcing material is present in an amount of about 50 to about 20 weight percent, and the ethylene polymer is present in an amount of from about 0.2 to about 5 weight percent, based on the weight of the composition.
5. The composition of claim 4 in which the poly(arylene sulfide) is poly(phenylene sulfide).
6. The composition of claim 5 in which the ethylene polymer has a density in the range of from about 0.910 to about 0.930 g/cc.
7. The composition of claim 6 in which the ethylene polymer is present in an amount of from about 0.25 to about 3 weight percent.
8. The composition of claim 1 in which the ethylene polymer has a melt index of greater than about 400 g/10 min.
9. A composition comprising
   (a) a poly(phenylene sulfide) present in an amount of from about 50 to about 65 weight percent;
   (b) an ethylene homopolymer having a density of from about 0.910 to about 0.930 g/cc and a melt index of greater than about 400 g/10 min and present in an amount of from about 0.25 to about 3 weight percent; and
   (c) a fibrous reinforcing material present in an amount of from about 25 to about 45 weight percent, based on the weight of the composition.
10. In a molding method wherein a reinforced poly(arylene sulfide) molding composition is extruded at an elevated temperature, the improvement which comprises extruding a reinforced poly(arylene sulfide) molding composition comprising an ethylene polymer having a density of from about 0.910 to about 0.940 g/cc and a melt index of greater than about 400 g/10 min.
11. The method of claim 10 comprising injection molding said composition.
12. The method of claim 10 in which the poly(arylene sulfide) is poly(phenylene sulfide) and the ethylene polymer is an ethylene homopolymer.
13. The method of claim 10 comprising extruding said composition at an elevated temperature into a mold.
14. The method of claim 10 in which the reinforcing material is selected from chopped glass and chopped carbon fibers.
15. A method for improving the crack resistance of a molded article prepared from a poly(arylene sulfide) molding composition, the method comprising
   incorporating an ethylene polymer having a density of from about 0.910 to about 0.940 g/cc and a melt index of greater than about 400 g/10 min in a molding composition comprising poly(arylene sulfide) and a fibrous reinforcing material.
16. The method of claim 15 in which the ethylene polymer is an ethylene homopolymer.
17. The method of claim 15 in which the reinforcing material is selected from glass and carbon fibers.
18. The method of claim 15 which further comprises injection molding said composition.
19. The composition of claim 1 in which the poly(arylene sulfide) is poly(phenylene sulfide) having a melt flow of from about 30 to about 400 g/10 min and the fibrous reinforcing material is carbon fibers.
20. The composition of claim 19 in which the ethylene polymer has a density of from about 0.910 to about 0.930 g/cc and a melt index greater than about 100 g/10 min and is present in the composition in an amount of from about 0.25 to about 3 weight percent.
21. The composition of claim 20 in which the ethylene polymer has a melt index of greater than about 400 g/10 min.
22. The composition of claim 21 in which the carbon fibers are present in the composition in an amount of from about 50 to 20 weight percent.
23. The composition of claim 22 further comprising from about 0.5 to about 2.0 weight percent of at least one of Li$_2$CO$_3$ and a hydrotalcite.
24. The method of claim 10 in which the reinforced poly(arylene sulfide) molding composition comprises from about 20 to about 50 weight percent of carbon fibers, based on the weight of the composition.

* * * * *

UNITED STATES PATENT AND TRADEMARK OFFICE
CERTIFICATE OF CORRECTION

PATENT NO. : 4,544,700

DATED : October 1, 1985

INVENTOR(S) : Roy F. Wright

It is certified that error appears in the above-identified patent and that said Letters Patent is hereby corrected as shown below:

In claim 10, lines 12 and 13, delete "400 g/10 min and insert -- 100 g/10 min --.

In claim 15, line 29, delete "400 g/10 min and insert -- 100 g/10 min --.

Signed and Sealed this

Eighth Day of April 1986

[SEAL]

Attest:

DONALD J. QUIGG

Attesting Officer

Commissioner of Patents and Trademarks